May 16, 1939.  W. W. BRASWELL  2,158,925
INDICATING INSTRUMENT
Filed April 22, 1936
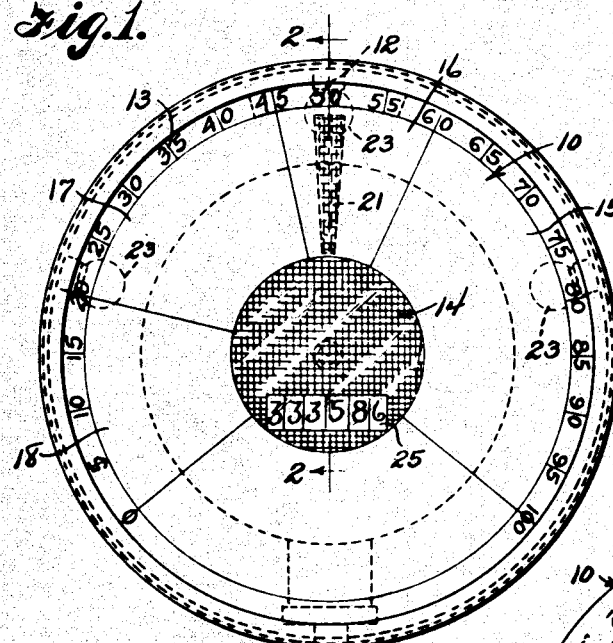
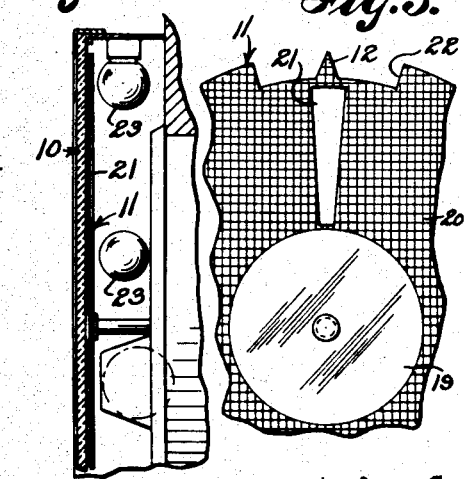
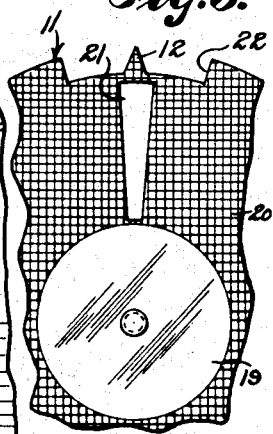
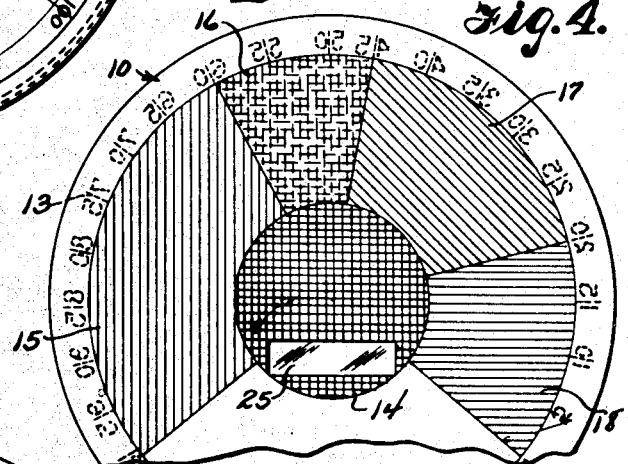
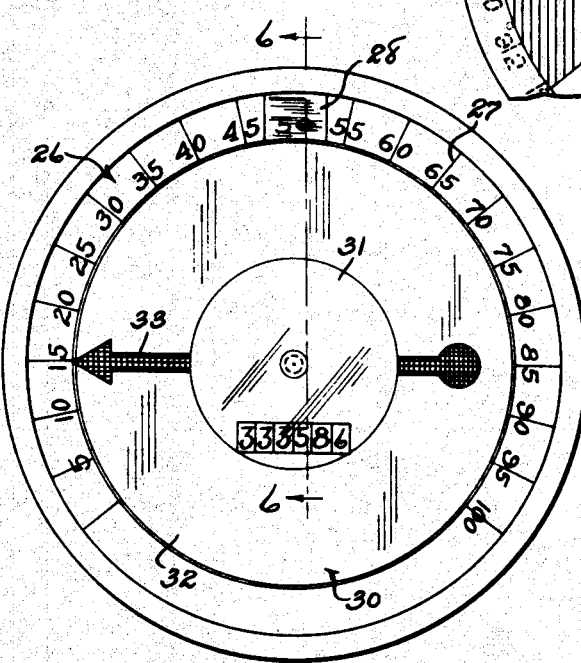
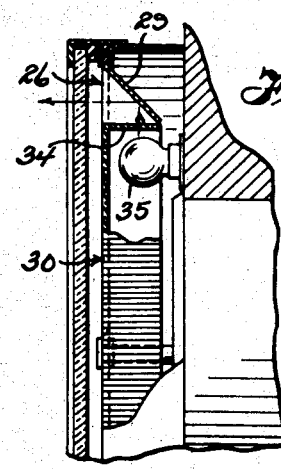
Welca W. Braswell
INVENTOR
BY Victor J. Evans & Co.
ATTORNEYS Patented May 16, 1939

2,158,925

UNITED STATES PATENT OFFICE 2,158,925

INDICATING INSTRUMENT

Welca W. Braswell, Washington, D. C., assignor of one-half to Mattie B. Shinholser, Washington, D. C.

Application April 22, 1936, Serial No. 75,820

1 Claim. (Cl. 116—129)

The object of the invention is to provide a dial and indicator combination for various forms of indicating instruments, particularly speedometers, so that the user, by mere casual observance, may be apprised at least of the approximate reading; to provide an indicating instrument consisting of relatively movable dial and indicator and associated light source in which either the dial or the indicator is provided with distinctively defined zones which, in combination with the light source and the indicator, are caused to be associated with definite groups of graduations on the dial; and generally to provide an instrument of the kind indicated which is of comparatively simple form for the functions to be performed and susceptible of cheap manufacture.

With this object in view, the invention consists in a construction and combination of parts of which a preferred embodiment is illustrated in the accompanying drawing, wherein:

Figure 1 is a front elevational view of one form of the invention.

Figure 2 is a sectional view on the plane indicated by the line 2—2 of Figure 1.

Figure 3 is a detail elevational view of the indicator.

Figure 4 is an elevational view of the rear side of the dial.

Figure 5 is an elevational view of a modified form of the invention.

Figure 6 is a sectional view on the plane indicated by the line 6—6 of Figure 5.

As illustrated in Figures 1 to 4, the invention comprises a dial 10 and indicator disk 11 positioned behind the dial and mounted for angular or turning movement with respect to the same, so that the pointer 12 may read over graduations 13 of the dial.

The dial is made preferably of a transparent material which is reduced to opacity at the center, as indicated at 14, and to translucency in the area surrounding the opaque area and for the angular extent of the graduations. The opaque zone 14 is secured by the application of either coloring matter to the rear face of the dial or by the application of a thin lamina, preferably black, as indicated in the drawing. Similarly the transparent area is secured and is divided into a series of zones 15, 16, 17 and 18 which are distinguishably colored, being respectively preferably red, yellow, green and blue. The zones 15 to 18 inclusive vary in angular extent so that each will embrace its own series of graduations 13 and the zone 16 is arranged preferably to embrace the graduations 45 to 60, the usual speed range in motor vehicles in touring.

The disk 11 is formed preferably from a thick sheet of transparent material and divided into the transparent and opaque zones 19 and 20, the former corresponding in size to the opaque zone 14 on the dial and the latter covering the remainder of the area of the disk. The opaque zone 20 is preferably black and in order that the pointer 12 may be clearly defined thereon, the disk is punched, as indicated at 21, to provide a window representative of the stem of the arrow head 12 which is positioned at the center of a recess 22 in the edge of the disk formed by cutting out a segment of the disk so as to leave a space on either side of the arrow head.

A light source is provided behind the dial in the form of lamps 23 positioned at spaced points as shown and the indicator is positioned in intervening relation to the light source and dial, so that its opaque zone obstructs the light from the lamps except where it may shine through the recess 22 and window 21.

Movement of the dial is accomplished through the conventional flexible shaft 24 designed to be connected with some moving part of the vehicle and as the indicator turns in response to speed changes, the arrow outline is thrown on the dial by the lamp source and its background, at the time of the indication, is shown by one of the translucent zones 15 to 18 inclusive, the blue zone indicating slow speeds, the green zone higher speeds, the yellow zone touring speeds and the red zone danger speeds. Therefore without the necessity for having to note definitely the actual speed, the distinguishably colored zones indicate generally the speed at which the vehicle is traveling.

In order that the conventional odometer may be used with the invention, the zone 14 in the dial is provided with a transparent area or zone 25 through which the digits of an odometer are observable, the transparent zone 19 in the indicator disk, although intervening between the odometer and the dial, leaving the window or zone 25 visually unobstructed.

In that form of the invention shown in Figures 5 and 6, the dial 26 is in the form of a ring on which the graduations 27 are inscribed, the graduation 28 indicating the division between medium and hazardous speeds being inscribed on an ear 29 which is deflected back from the plane of the dial, so as to lie at an angle to the vertical. The indicator 30 in this form of the invention is also in the form of a disk made of transparent material of which a circular zone 31 at the center is untouched so that within the area of this zone the disk retains its transparent property. The remainder of the disk, however, is reduced to opacity to provide an annular opaque area 32 on which there is outlined a distinctively colored arrow 33, preferably black in color, to contrast with the light background of the opaque area 32.

The indicator disk 30 is formed with a rearwardly directed annular flange 34 which is colored to provide distinguishably colored zones of the order of the zones 15 to 18 inclusive.

The light source in this form of the invention is in the form of a lamp 35 positioned behind the indicator disk but below the ear 29 and within the flange 34, so that its rays will shine through the flange onto the graduation 28. As the disk rotates in the indicating operation, the differently colored zones are presented to the light source and accordingly the graduation 28 shows up in different colors, depending on the position of the disk. In this way general indication is given of the speed range, the actual indication of which is shown by the position of the arrow 33 with respect to any one of the graduations 27 or the graduation 28, if the speed actually is in accordance with the latter graduation.

The invention having been described, what is claimed as new and useful is:

In a speedometer or like instrument, a dial formed with a series of distinctively colored translucent zones, an indicator mounted behind the dial for angular or turning movement with respect thereto and consisting of a disk having a central circular transparent zone and a surrounding opaque zone conterminous with all of the translucent zones, said disk being circumferentially recessed along its marginal edge to define an arrow head centrally of the recess and the disk having a window radiating in outwardly tapered formation from adjacent the transparent zone to adjacent the arrow head to define the stem of the arrow, a light source behind the indicator to direct light through the recess and window defining the arrow and through the translucent zones in the movement of the indicator, and the dial having a circular opaque zone corresponding to the transparent zone in the indicator and a transparent zone bounded by the opaque zone and through which the digits of an odometer may be observed.

WELCA W. BRASWELL.